(12) United States Patent
Goodman

(10) Patent No.: US 6,625,757 B1
(45) Date of Patent: Sep. 23, 2003

(54) METHOD AND AN APPARATUS FOR CHECKING THE VOLTAGE OF A DEVICE

(75) Inventor: Martin D. Goodman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 09/607,874

(22) Filed: Jun. 30, 2000

(51) Int. Cl.[7] .......................... G06F 11/00; G01R 31/28
(52) U.S. Cl. ............................. 714/22; 714/39
(58) Field of Search ..................... 714/22, 25, 14, 714/39, 31, 37, 43, 44, 45, 46, 47, 23, 24, 30; 327/63, 77, 143

(56) References Cited

U.S. PATENT DOCUMENTS

| | | | | |
|---|---|---|---|---|
| 4,906,055 A | * | 3/1990 | Horiuchi | 307/354 |
| 5,272,393 A | * | 12/1993 | Horiguchi et al. | 307/296.6 |
| 5,329,193 A | * | 7/1994 | Lu | 307/592 |
| 5,612,920 A | * | 3/1997 | Tomishima | 365/226 |
| 6,215,332 B1 | * | 4/2001 | Atsumi et al. | 327/63 |

* cited by examiner

*Primary Examiner*—Nadeem Iqbal
(74) *Attorney, Agent, or Firm*—Blakely, Sokoloff, Taylor & Zafman LLP

(57) ABSTRACT

A circuit comprising a clocked device having at least one comparison circuit. The comparison circuit checks at least one signal from a network to obtain a reference voltage in order to determine that voltage applied to the core circuitry is acceptable for a mode of operation of the processor. The clocked device is also coupled to a voltage regulator.

14 Claims, 4 Drawing Sheets

METHOD AND AN APPARATUS FOR CHECKING THE VOLTAGE OF A DEVICE

BACKGROUND OF THE INVENTION

1. Field of the Invention

This invention relates to a method by which a multi-frequency device checks the core voltage applied to the device and compares the core voltage to a reference to ensure that the appropriate voltage is being applied for the frequency at which the device is being operated.

2. Background

Clocked devices such as processors used in computers may operate at multiple speeds. For example, a processor may have a fast speed and a slow speed. A processor in a power saving mode generally operates at a low speed and a relatively low supply voltage ("Vcc"). A processor in a performance mode generally operates at a fast speed and a relatively high Vcc.

If the applied voltage is not at the correct level for the processor to operate at the fast speed, the multi-frequency device generally attempts to load a first piece of software that starts a computer or "boots up" a computer with the processor running at the slow speed, and once the boot process has completed, the processor tries to run at the higher speed. One disadvantage of such a device is that without the proper voltage being applied to the processor, the processor will not be able to operate reliably at the higher speed. Another disadvantage to these processors is that the user is not provided information as to the reason for which the processor is not operating. Therefore, it is desirable to have an apparatus that is capable of overcoming the disadvantages associated with conventional devices.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

One embodiment of the invention relates to a multi-frequency device configured to operate at multiple frequencies. The multi-frequency device is capable of checking the voltage being applied to its core circuit and comparing this voltage to a reference voltage to ensure the appropriate voltage is being applied to the core circuit relative to the frequency at which the multi-frequency device is being operated. If the applied voltage is not correct for the attempted speed, the multi-frequency device performs at least one action of several actions. For example, the multi-frequency device may indicate to the user that the voltage applied to the core circuitry is insufficient for the multi-frequency device to operate at the fast speed.

Another embodiment of the invention relates to the processor being configured such that the processor only runs at the speed acceptable for the applied voltage. In yet another embodiment of the invention, the processor may be able to execute code that logs the system error. This prevents data corruption or data loss.

In the following description, numerous specific details are set forth to provide a thorough understanding of the invention. However, it will be understood by one of ordinary skill in the art that the invention may be practiced without these specific details. In other instances, well known structures and techniques have not been shown in detail to avoid obscuring the invention. Presented below is a computer system that is one example of a clocked device that may be used to implement techniques of the invention. Thereafter, two examples of circuits that may be used are presented. It will be appreciated, however, that the number of ways to configure a circuit that implements techniques of the invention and the configuration of the circuit is limited only by the creativity of one skilled in the art.

Figure 1:
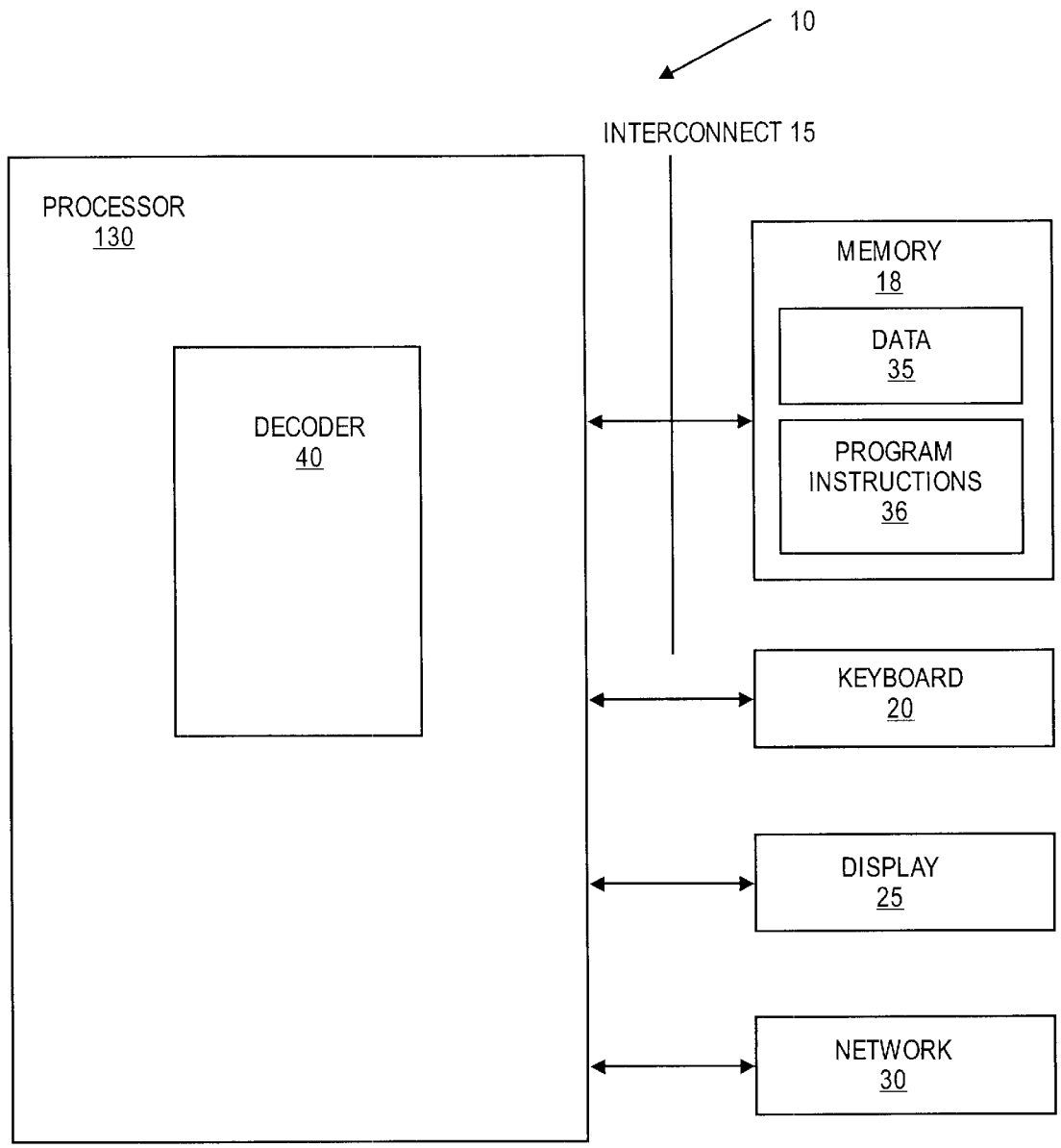
FIG. 1 illustrates a computer system in accordance with one embodiment of the invention.

FIG. 1 illustrates one embodiment of a computer system 10 that implements the principles of the present invention. Computer system 10 comprises a processor 130, a memory 18, and interconnect 15 such as bus or a point-to-point link. Processor 130 is coupled to the memory device 18 by interconnect 15. In addition, a number of user input/output devices, such as a keyboard 20 and a display 25, are coupled to chip set (not shown) which is then connected to processor 130. The chipset (not shown) is typically connected to processor 130 using an interconnect that is different from interconnect 15.

Processor 130 represents a central processing unit of any type of architecture (e.g., the Intel architecture, Hewlett Packard architecture, Sun Microsystems architecture, IBM architecture, etc.), or hybrid architecture. In addition, processor 130 could be implemented on one or more chips. Memory 18 represents one or more mechanisms for storing data. Memory 18 may include read only memory (ROM), random access memory (RAM), magnetic disk storage media, optical storage media, flash memory devices, and/or other machine-readable media. Interconnect 15 represents one or more buses (e.g., accelerated graphics port bus, peripheral component interconnect bus, industry standard architecture bus, X-Bus, video electronics standards association related to buses, etc.) and bridges (also termed as bus controllers).

While this embodiment is described in relation to a single processor computer system, the invention could be implemented in a multi-processor computer system. In addition to other devices, one or more of a network 30 may be present. Network 30 represents one or more network connections for transmitting data. The invention could also be implemented on multiple computers connected via such a network.

FIG. 1 also illustrates that the memory device 18 has stored therein data 35 and program instructions (e.g. software, computer program, etc.) 36. Data 35 represents data stored in one or more of the formats described herein. Program instructions 36 represents the necessary code for performing any and/or all of the techniques described with reference to FIGS. 2–4. It will be recognized by one of ordinary skill in the art that the memory device 18 preferably contains additional software (not shown), which is not necessary to understanding the invention.

FIG. 1 additionally illustrates that the processor 130 includes decoder 40. Decoder 40 is used for decoding instructions received by processor 130 into control signals and/or microcode entry points. In response to these control signals and/or microcode entry points, decoder 40 performs the appropriate operations.

Figure 2:
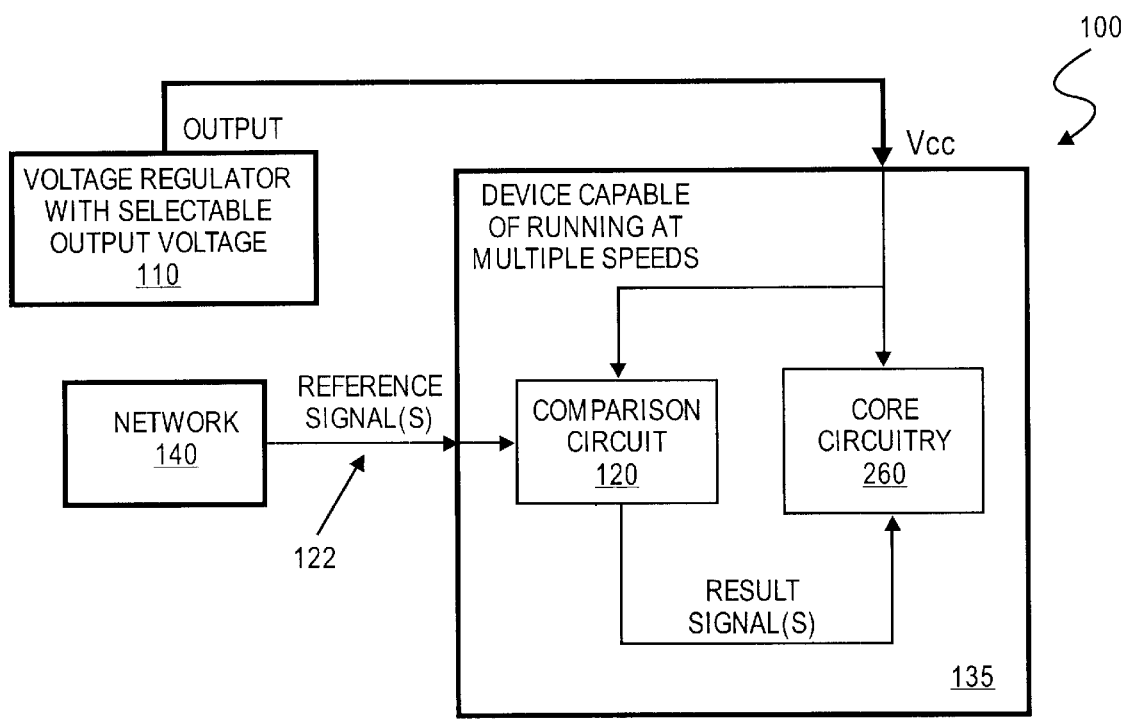
FIG. 2 illustrates a circuit in accordance with one embodiment of the invention.

FIG. 2 illustrates one circuit used in a multi-frequency device to implement techniques of the invention. Circuit 100 comprises clocked device 135 coupled to network 140 through connection 122 and to comparison circuit 120 that may be internal or external to clocked device 135. Comparison circuit 120 is configured to handle digital or analog signals from the external network 140. Coupled to comparison circuit 120 and to clocked device 135 is core circuitry 260. Core circuitry 260 may include a decoder for decoding instructions, memory and logic gates. Clocked device 135 is also coupled to voltage regulator 110. Voltage regulator 110 controls the voltage ("$V_{cc}$") of the power supply for a signal that is applied to clocked device 135. For example, if the device is to operate at a fast speed such as at 750 megahertz ("MHz"), the voltage that should be applied to clocked device 135 by the voltage regulator 110 is at a higher level, e.g., 1.6 volts ("V"). If the multi-frequency device is to operate at a slow speed such as 600 MHz, the applied voltage should be at a lower level, e.g., 1.35 V.

Comparison circuit 120 samples and checks the voltage Vcc being applied to clocked device 135. Comparison circuit 120 then compares the voltage applied to clocked device 135 to the reference obtained from network 140. If the voltage being applied to clocked device 135 is too low or too high for the desired speed, comparison circuit 120 issues a signal to core circuitry 260 indicating the out of range Vcc. Core circuitry 260 then performs one or more of multiple actions. These actions, performed by the hardware and/or the software of the device, include the device issuing a warning indicating that the applied voltage is incorrect to operate at the desired speed. Another action involves the device entering a fault condition that stops the device and optionally indicates to the user that the voltage applied to the device is insufficient. The device may also halt its operation. The processor of the device may also issue an interrupt to the operating system of the device. Another action is that the device may toggle an external signal. Yet another action is that the device may try to operate at the higher speed. Yet another action is that the device may run only at the speed acceptable for the applied Vcc.

Figure 3:
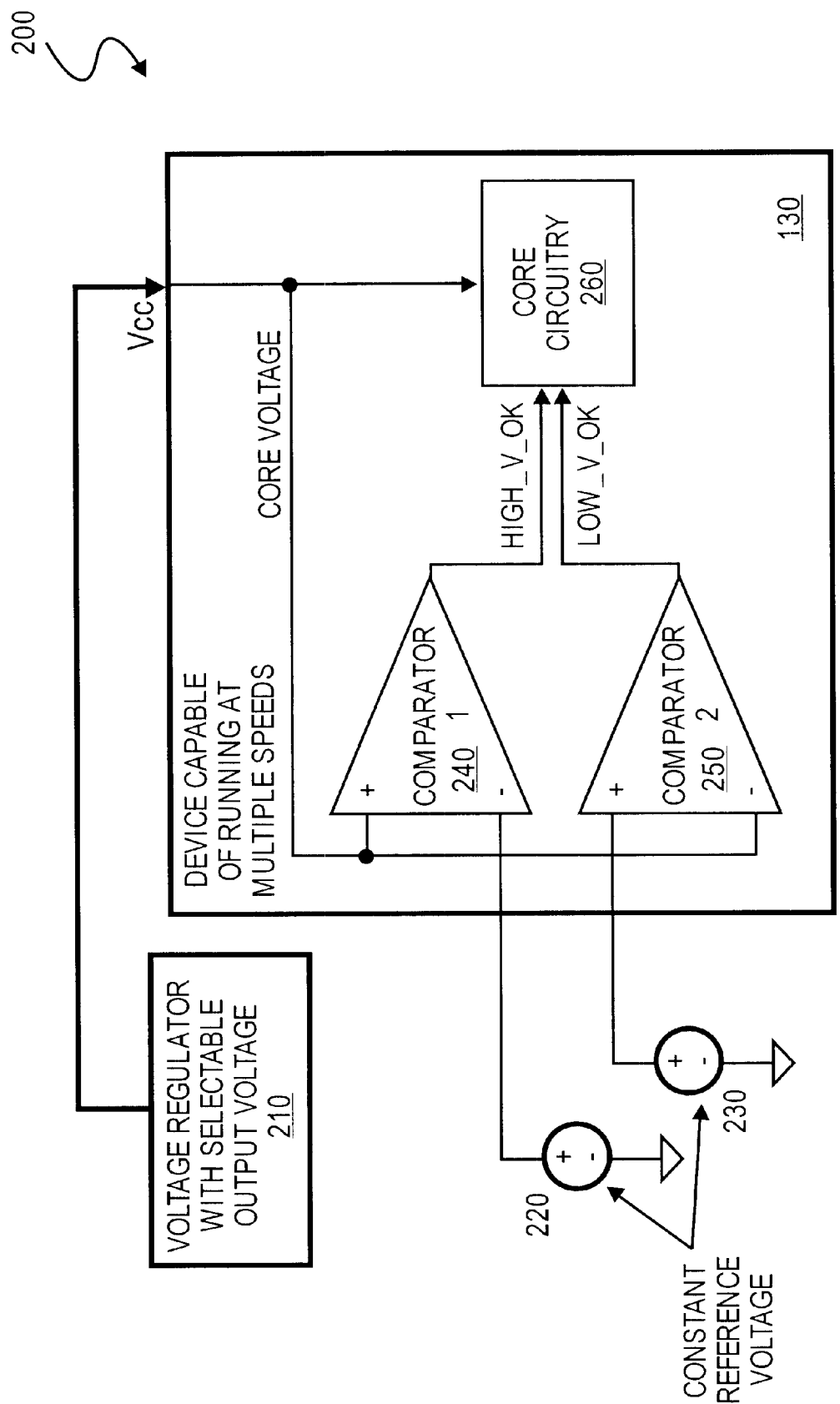
FIG. 3 illustrates a circuit in accordance with one embodiment of the invention.

FIG. 3 illustrates circuit 200 that implements techniques of one embodiment of the invention. Circuit 200 includes at least one or more comparators (240, 250), and core circuitry 260 located in clocked device 135. Voltage regulator 210 is coupled to clocked device 135. Coupled to two comparators (240, 250) are constant reference sources (220, 230) that are obtained from a connection to a network (not shown) that may be external or internal to circuit 200. Each constant reference source is a reference voltage. For example, constant reference source 220 establishes a reference voltage for the device to operate at a fast speed whereas reference source 230 establishes the voltage reference for the device to operate at a slow speed. Reference sources (also referred to herein as first reference source and second source reference (220, 230) establish the voltage references for each speed that the device operates. It will be appreciated that additional constant reference sources may be added if there are more than two speeds for clocked device 135.

Circuit 200 operates in the following fashion. Voltage regulator 210 controls the voltage $V_{cc}$ of the power supply (not shown) that is applied to clocked device 135. $V_{cc}$ is then applied to core circuitry 260.

First comparator 240 samples and checks the voltage being applied to core circuitry 260. After determining the voltage applied to core circuitry 260, first comparator 240 checks reference source 220 to determine whether the voltage applied to core circuitry 260 meets the minimum voltage level established by reference source 220 for the device to operate at a fast speed. If the applied voltage is below the voltage level provided by reference source 220, a signal such as HIGH_V_OK goes inactive. This indicates to core circuitry 260 that the voltage applied to core circuitry 260 is not high enough for the device to operate at a fast speed. As a result, clocked device 135 may perform one or more of several actions. These actions, performed by the hardware and/or the software, include the device issuing a warning indicating that the applied voltage is incorrect to operate at the desired speed. Another action involves the device entering a fault condition that stops the device and optionally indicates to the user that the voltage applied to the device is insufficient. The device may also halt its operation. The clocked device may also issue an interrupt to the operating system. Another action is that the device may toggle an external signal. Yet another action is that the device may try to operate at the higher speed. Yet another action is that the device may run only at the speed acceptable for the applied Vcc In contrast, if the applied voltage equals or is greater than the minimum voltage level established by reference source 220, the HIGH_V_OK signal to core circuitry 260 goes active. This indicates that the applied core voltage has been raised to a sufficient level for the device to operate at a fast speed.

It will be appreciated that although an applied voltage that is greater than the minimum voltage causes the HIGH_V_OK signal to core circuitry 260 to go active, the multi-frequency device, in this scenario, does not specifically test for a voltage that is greater than the maximum voltage that is allowed. In order to test for a higher voltage, a third comparator and a third reference source should be added to circuit 200. A system designer may find the addition of a third comparator and a third reference source a desirable option in order to reduce the possibility of damage to the circuit, the amount of power wasted, and the amount of heat generated from the excess voltage.

Instead of operating at a fast speed, another speed may be desired such as a medium speed, slow speed, or any other desired speed. If the multi-frequency device is to operate at a medium speed (or an alternative speed), the voltage that should be applied to the clocked device will be designated by the system designer. If the applied voltage is lower than that which is the expected voltage, then the operating system may not boot up properly, random failures may occur, data may be lost or other errors may result. On the other hand, if the applied voltage is greater than that which is expected, power is wasted and unnecessary heat is generated creating an additional burden on the cooling system of the computer system.

In addition to operating at a medium speed, the clocked device 135 may also operate at a slow speed. Generally, operating at a slow speed is considered a power saving mode. In the power saving mode, voltage regulator 210 controls a signal having a voltage $V_{cc}$ that is applied to clocked device 135. $V_{cc}$ is then applied to core circuitry 260.

Second comparator 250 samples and checks the voltage being applied to core circuitry 260. Second comparator 250 then checks reference source 230. Reference voltage 230 establishes a maximum value below which the voltage applied to core circuitry 260 must be lowered for power saving to occur.

If the voltage applied to core circuitry 260 is below the reference voltage established by reference voltage 230, a signal goes active such as LOW_V_OK and is sent to core circuitry 260. This indicates to the core logic that $V_{cc}$ is sufficiently low to allow for a power saving operation. In comparison, if the voltage applied to core circuitry 260 exceeds the reference voltage established by reference source 230, the LOW_V_OK signal to core circuitry 260 goes inactive. This indicates to the core logic that the voltage applied to core circuitry 260 has not been lowered to the expected value for a power saving operation to occur.

Although an applied voltage that is lower than the maximum voltage causes the LOW_V_OK signal to core circuitry 260 to go inactive, the multi-frequency device, in this scenario, does not specifically test for a voltage that is less than the minimum voltage that is allowed. In order to test for a lower voltage, a fourth comparator and a fourth reference source should be added to circuit 200. A system designer may find the addition of a fourth comparator and a fourth reference source a desirable option in order to ensure that the operating system properly boots up and data loss is minimized.

Figure 4:
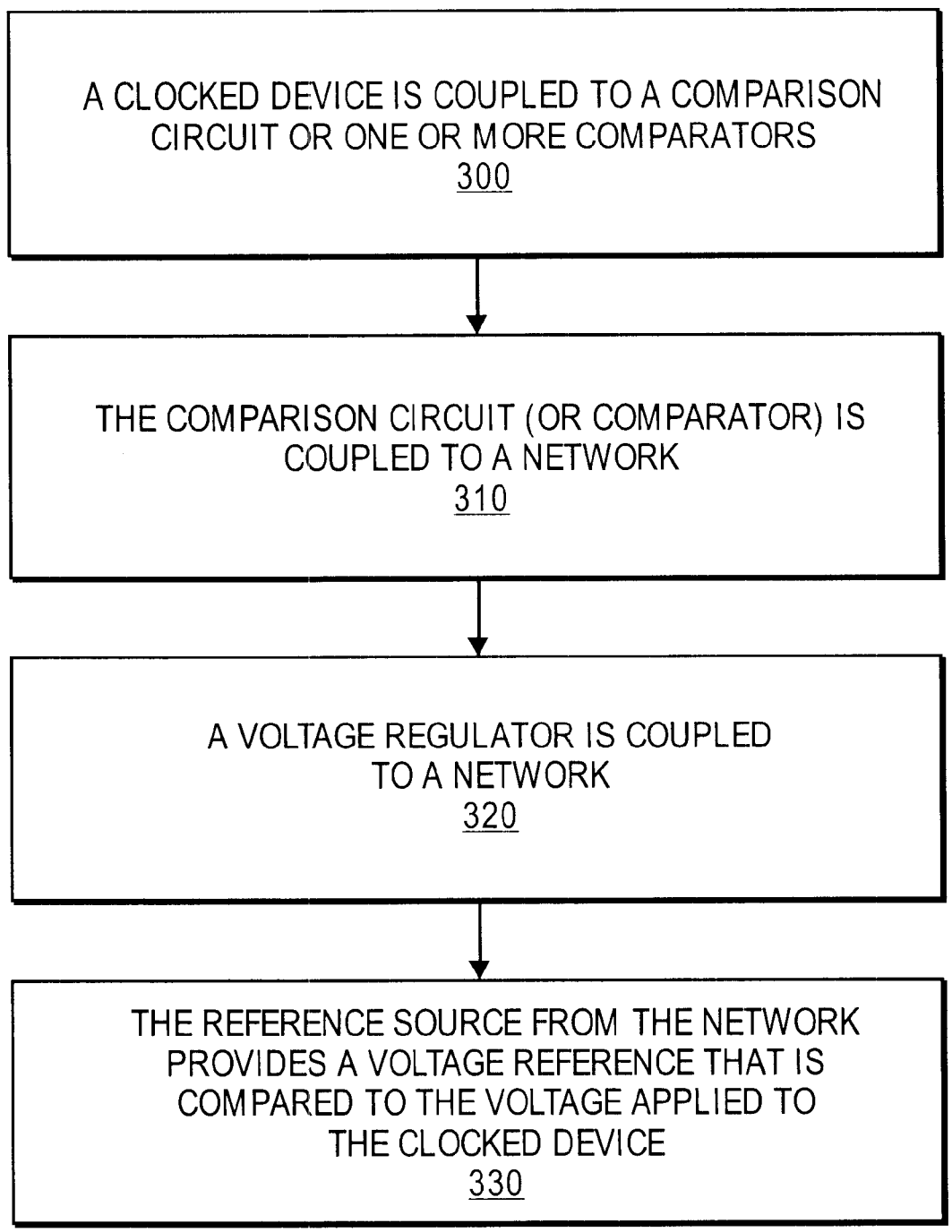
FIG. 4 illustrates a flow diagram in accordance with one embodiment of the invention.

FIG. 4 illustrates a flow diagram of one embodiment of the invention. At block 300, a clocked device 135 is coupled to a comparison circuit or at least one or more comparators. At block 310, the comparison circuit (or comparator) is coupled to a network. The network provides a reference voltage that indicates the proper voltage that should be applied to the core circuitry of a clocked device 135 in order for the clocked device to reliably operate at the desired speed. At block 320, a voltage regulator is coupled to the network to control the voltage of the signal from a power source applied to the core circuitry of the clocked device. At block 330, the reference source that provides a voltage reference from the network is compared to the voltage applied to the clocked device. In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:

coupling a clocked device to a comparison circuit;

coupling the comparison circuit to a first voltage reference;

coupling a voltage regulator to a core circuitry; and comparing a voltage from the first voltage reference coupled to a voltage applied to the clocked device, if the voltage applied to a core circuitry is below voltage set by a second reference, the comparison circuit sends a signal to the core circuitry indicating the voltage applied to the core circuitry is sufficiently low for a power saving operation.

2. The method of claim 1, further comprising:

comparing a voltage from a second voltage reference.

3. The method of claim 1, further comprising:

performing an action by the clocked device.

4. The method of claim 3, wherein the action is one of the clocked device providing a warning that the applied voltage is insufficient, the clocked device indicates that a fault condition exists, the clocked device halts, the clocked device issues an interrupt, the clocked device toggles an external signal, and the clocked device operates at a higher speed.

5. The method of claim 1, wherein if the voltage applied to a core circuitry is below a minimum voltage set by a first reference, the comparison circuit sends a first signal to the core circuitry indicating that the voltage applied to the core circuitry is insufficient for a faster speed operation.

6. The method of claim 1, wherein if the voltage applied to a core circuitry exceeds a minimum first voltage reference, the comparison circuit sends a second signal to the core circuitry indicating that the voltage applied to the core circuitry is sufficient for a faster speed operation.

7. The method of claim 1, wherein if the voltage applied to a core circuitry exceeds a second reference, the comparison circuit sends a signal to the core circuitry indicating that the voltage applied to the core circuitry is not sufficiently low for a power saving operation.

8. The method of claim 7, further comprising:

performing an action by the clocked device.

9. The method of claim 8, herein the action is one of the clocked device providing a warning that the applied voltage is insufficient, the clocked device indicates that a fault condition exists, the clocked device halts, the clocked device issues an interrupt, the clocked device toggles an external signal, and the clocked device operates at a higher speed.

10. A circuit comprising:

a core circuitry coupled to a first comparator which checks at least one first signal from a network, the first signal has at least one of a first voltage reference and a second voltage reference;

the first comparator compares the first voltage reference with a voltage applied to a core circuitry; and the core circuitry is coupled to a voltage regulator, if the voltage applied to a core circuitry is below a second reference voltage, the second comparator sends a signal to the core circuitry indicating that the voltage applied to the core circuitry is sufficiently low for a power saving operation.

11. The circuit of claim 10, further comprising:

a second comparator is coupled to the core circuitry.

12. The circuit of claim 10, wherein if the voltage applied to a core circuitry is below a minimum voltage set by a first reference, the first comparator sends a first signal to the core circuitry indicating that the voltage applied to the core circuitry is insufficient for a faster speed operation.

13. The circuit of claim 10, wherein if the voltage applied to a core circuitry exceeds a minimum voltage set by a first reference, the first comparator sends a second signal to the core circuitry indicating that the voltage applied to the core circuitry is sufficient for a faster speed operation.

14. The circuit of claim 10, wherein if the voltage applied to a core circuitry exceeds a second reference voltage, the second comparator sends a signal to the core circuitry indicating that the voltage applied to the core circuitry is not sufficiently low for a power saving operation.

* * * * *